United States Patent [19]

Huntzinger

[11] 4,254,078
[45] Mar. 3, 1981

[54] REVOLVING HYDRAULIC PRESS WITH HEATED PLATEN

[75] Inventor: Guy A. L. Huntzinger, Strasbourg, France

[73] Assignee: Forges de Strasbourg, France

[21] Appl. No.: 962,134

[22] Filed: Nov. 20, 1978

[30] Foreign Application Priority Data

Nov. 21, 1977 [FR] France ............................. 77 35298

[51] Int. Cl.³ .............................................. B30B 11/02
[52] U.S. Cl. ................................ 264/320; 100/93 P; 100/223; 100/DIG. 18; 264/325; 264/334; 425/520; 425/116; 425/143; 425/149; 425/233; 425/347; 425/411; 425/453
[58] Field of Search ............ 100/DIG. 18, 93 P, 223; 425/234, 182, 185, 345, 347, 409, 415, 411, 451, 453, 454, DIG. 128, 211, 439, 424, 456, 233, 520, 143, 149; 264/310, 334, 320, 325

[56] References Cited

U.S. PATENT DOCUMENTS

| | | | |
|---|---|---|---|
| 3,003,188 | 10/1961 | Weiss | 264/310 |
| 3,798,300 | 3/1974 | Verbeke | 264/310 |
| 3,841,141 | 10/1974 | Rachwal | 100/DIG. 18 |
| 3,856,451 | 12/1974 | Holzinger | 264/310 |
| 4,025,265 | 5/1977 | Auer | 425/453 |

Primary Examiner—Jeffery R. Thurlow
Attorney, Agent, or Firm—Prutzman, Kalb, Chilton & Alix

[57] ABSTRACT

New type of hydraulic presses with heating plates are described.

The press ensemble has a compact structure which allows the symmetric absorption of expansions due to heating and is equipped with ways allowing to bring the heating plates to a same level in comparison to the ground.

The hydraulic presses are used to form moldable material by polymerization and pressing of rotor hubs of helicopters.

6 Claims, 3 Drawing Figures

REVOLVING HYDRAULIC PRESS WITH HEATED PLATEN

The present invention has for a purpose a new type of press and its applications in the industrial field.

The invention concerns more particularly some new hydraulic presses with heating plates.

The presses with heating plates are already well known in the industry and are used regularly in the areas of shaping, cast pressing or in the operations necessitating a deformation of synthetic materials with heat.

These tradiational presses present certain problems.

In the first place, it is noted that these presses carry two heating plates, indeed even three for certain among them. These two plates are arranged face to face with each supporting a half mold. In all that follows, these half-molds, respectively supported by each one of the heating plates, will be designated by the expression "tool stock".

In the traditional presses, the upper plate having the tool stock of the upper plate is fastened thereto is a stationary plate as a result a great deal of difficulty is encountered when one wishes to change the tool stock of the press additionally there is a loss of considerable time.

On the other hand, the two plates are joined one to the other by their frame or support. In this type of press, there is then at any given moment during its operation a lack of thermal symmetry, which means that the expansion produced by an increase of temperature is not spread out in the assembly in a the symmetric manner. This is a gross disadvantage which even necessitates the use of ways in order to limit the effects of this asymetric expansion, for example some bolts to limit the expansion.

Finally, once the tool stocks are loaded on each of the plates and they already contain the synthetic material to be pressed, it is still necessary to bring the two plates face to face, the two plates being placed on the parts of the support joined to one another. This closing of the plates is controlled by jacks, which means that it is not continuous but is done in thrusts. This frequently results in the synthetic matter to be pressed getting out of the mold, to which it is held only by the forces of adhesion coming from its physical state.

The present invention has for a purpose to mitigate all these disadvantages.

According to the invention, this result is obtained by providing a hydraulic press with heating plates in which the press components and the tool stocks are placed solidly in a framing equipped with ways allowing it to bring the two heating plates to the same level in comparison to the ground, preferably by rotation of the mess 180° about its axis of symmetry perpendicular to its face. This entirely new press concept with heating plates resolves all the problems which are posed as a general rule in all presses where one is trying to obtain a rapid loading of tool stocks and in which some phenomena of expansion are produced according to three axes.

By providing this structure it overcomes the problem posed by the loading of tool stocks and mitigates the thrust problem when positioning the two plates one in comparison to the other when the tool stocks already contain the material being pressed.

The problem of loading of the tool stock of the upper plate is then posed. In fact, the tool stocks used in this type of press are as a general rule in INVAR. This implies that they must be loaded at a constant temperature. The loading is done practically on an air cushion: the tool stocks are placed on a heating table equipped with pipes through which air under pressure escapes. The tool stocks are then pushed to the interior of the press.

In order to be able to load in this manner the two plates it is then imperative that these can be at a given moment brought up to the same level in comparison to the ground, that is in fact to a level of the loading table of the tool stocks.

This result is obtained in a perfect manner by imparting a rotation of 180° to the press assembly made up by the plates and the slide-block. This rotation can be effected at first around any axis of symmetry of the assembly, but preferably one effects it around the axis perpendicular to the face of the framing.

This rotation can be obtained by any conventional means, for example by placing the assembly on rollers put in rotation by a feed motor.

All the necessary connections between the turning press and the various devices, namely the heater station, computer, hydraulic group, control box, are made through flexible tubes. These tubes are guided by a cable holder chain that reduces the torsion and the wearing due to friction, the chain itself being rolled up on the internal part of the machine while in its pressing position and resting in a pit when the press carries out a rotation of 180°.

This permits freedom from all swivel connections. Besides, there is no problem of eventual wearing of the tubes for they always follow the same trajectory which is controlled by the cable holder chain. The radii of the bend of different tubes are in this way guaranteed by a radius of minimum bend of the cable holder chain.

The press for example, can be equipped with an amplifying electrohydraulic line, working in a closed loop; the functions of speed, of increase in pressure and of positioning, as well as the automatic regulation of temperatures, being controlled and administered by a computer.

In a preferential manner, it is possible to work effectively in closed loop with this type of press by the constant monitoring of four important parameters, namely the pressure, the temperature, the time and the position of the two plates one in relationship to the other, whereby the computer can carry out the necessary corrections in terms of preset programs.

Also, the computer can administer equally the curves of acceleration and deceleration of the rotation of the press.

This invention also resolves the problems of expansion at the level of the tool stocks and of the framing. In fact, there is at no moment a break of symmetry and the three axes of symmetry of the press remain always coinciding, whatever be the temperature: the expansions then are rigorously symmetrical.

In fact, by presenting the plates in a compact framing, all the expansions are spread out without problems by the whole machine which remains globally indeformable.

One form of realization of the invention chosen under the heading of example is described hereafter and illustrated by the sketches attached.

Figure 1:
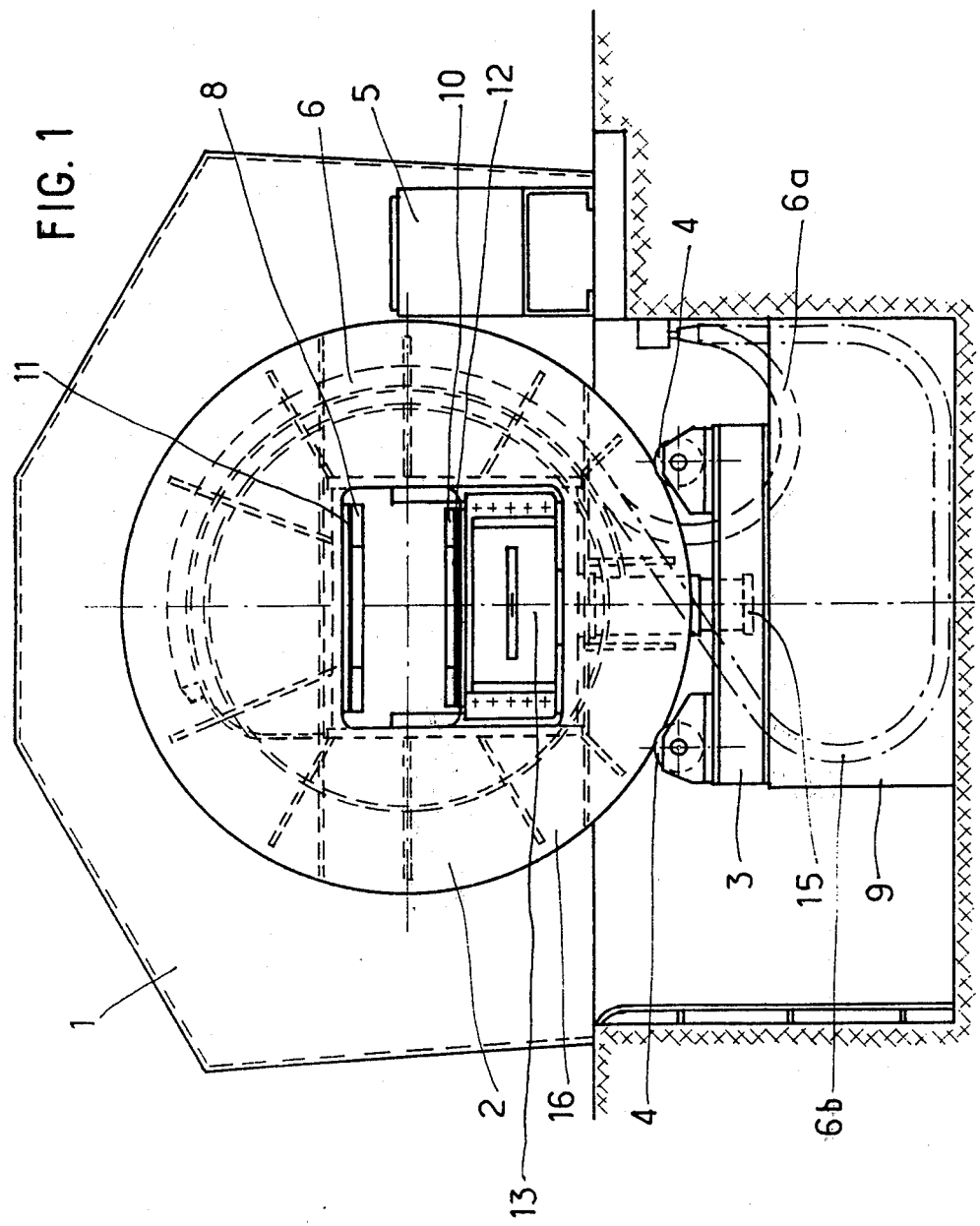
FIG. 1 represents a front elevational view of the turning press with the front part of the housing being removed.

The press such as represented on FIG. 1 is made up by a housing 1 and a press assembly 2. The press assembly 2 is made up of a framing or drum 16 and rests on a press support 3 equipped with rollers 4 for rotatably supporting the press assembly 2. The press assembly 2 is powered by a hydraulic station 5 connected to the press assembly by tubes 6. These tubes 6 serve at the same time for supplying power to the jacks 15 and sensing the pressure and temperature.

In working position, the tubes 6 are in position 6a, that is to say rolled around the press assembly. In the loading position for the upper heating plate 8, the tubes are in position 6b, in a pit 9 placed below the press.

The press assembly 2 includes, beside the framing 16, two heating plates 8 and 10 placed on insulating plates 11 and 12. Then, heating plate 10 is placed on the slide-block 13. In the side view of FIG. 2 there is shown, the housing 1 and the press assembly 2, as well as jack 15.

Figure 2:
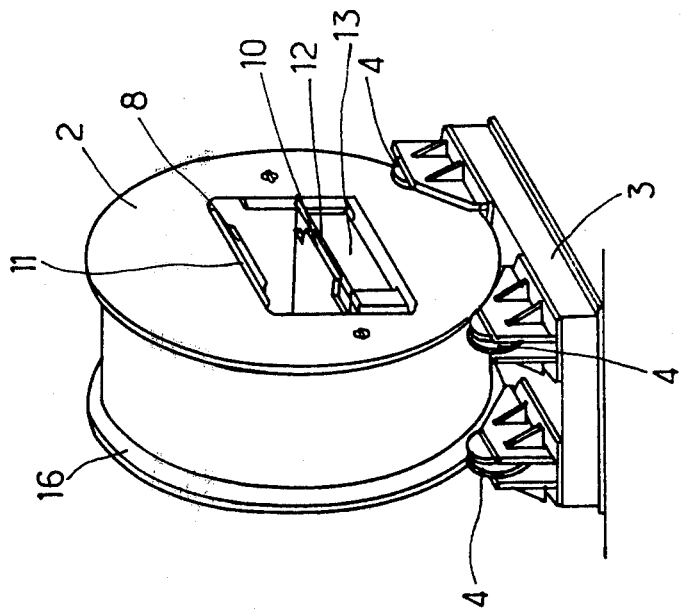
FIG. 2 represents a side view of the turning press.

The press assembly 2 rests on support 3 equipped with rollers 4 for rotatably supporting of the press assembly. These rollers are rotatably driven by a feed motor 14. FIG. 2 also shows the pit 9 into which the feed tube 6 comes to rest at the time of the rotation of the press.

Figure 3:
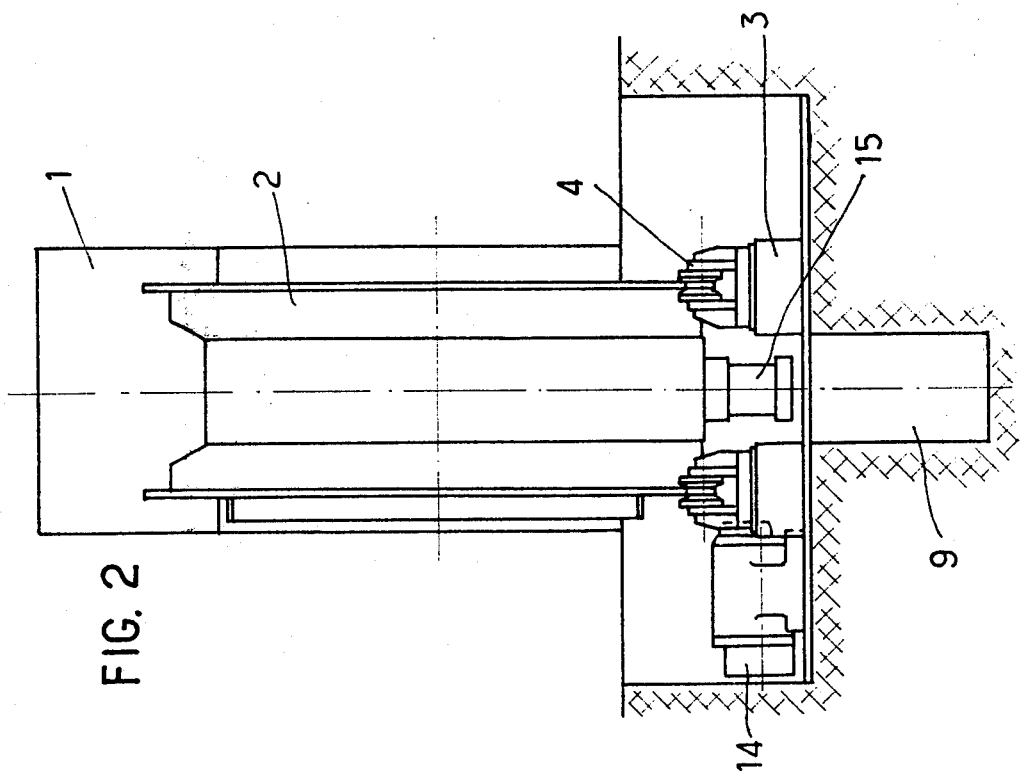
FIG. 3 represents a perspective view of the press assembly.

In FIG. 3, one notes the press assembly 2, press supports 3 and the rotatable drive rollers 4. One also sees slide-block 13 and the two heating plates 8 and 10, as well as the insulating plates 11 and 12.

This arrangement also offers the maximum security for the operator. In fact, housing 1 projects in front of framing 16 and all the mechanisms set in rotation are directly inaccessible. On the other hand, the heat emitted from the framing by the heating is diffused to the interior of the housing and the operator can not touch the framing. Thus, in case of accidental breakage of a heat feeding tube, the vapor or liquid ejected will remain in the housing and will not be thrown on the outside of the machine.

Hereafter an example of an application of the press is described such as described above in the manufacture by pressure and hot polymerization of a rotor hub of helicopters of the STARFLEX type (Starflex is a brand name registered in the name of the National Corporation of Aeronautical and Spatial Industries S.N.I.A.S.).

This hub is made up of a central star in epoxy fiberglass, furnished with spherical abutments in lamified elastomer which, when polymerized with heat, forms a compact part.

In the first stage, the turning press has its heating plates already maintained at an initial temperature and with the lower plate 10 in its, lower position. One then loads the tool stock containing a part of the material to press on a cushion of air and fixes it on the plate by activating the checking jacks when it appears to be in its appropriate position.

One then imparts to the press assembly a 180° rotation, administered by a computer, in a way to bring the plate 8 to the height of the loading table. One then loads in the same way tool stock on the plate 8 which positions itself in relation to the tool stock of the upper plate thanks to a system of abutments which permits avoiding of all imprecision in the positioning.

One then can carry out the increases in temperature and pressure, as well as the displacement of the two plates one in relation to the other. The conditions to attain are a pressure of approximately 50 tons for a temperature of 140° in the part to be molded, this in an interval of time on the order of 6 to 7 hours. The positioning is regulated by displacements in degrees on the order of 0.3 mm. One thus obtains, after cooling and ejection of the part, a hub having the perfect sought after properties. It is clear that the invention is not limited to this style of use and it can be adapted on any press on which one is seeking a precise and rapid loading of tool stocks and where one is looking for a distribution of expansion due to the elevation of temperature according to three axes of symmetry. This is the case for molding presses, forming presses, presses operating a metal stamper with heat and introducing presses.

I claim:

1. In a hydraulic press for heating and forming moldable material into a hub for a helicopter rotor and the like comprising a press assembly having a frame with a vertical face and a pair of mold-receiving heating plates mounted on the frame in confronting relationship, a support mounting the press assembly, means for closing the assembly and control means for controlling the operation of the assembly, the combination including means for rotating said frame through an angle of at least 180° around an axis perpendicular to said vertical frame face, said heating plates in their mold-receiving condition being positioned equidistant from and on opposite sides of said axis whereby each plate can be positioned within the same horizontal plane by 180° rotation of said frame.

2. The hydraulic press of claim 1 wherein said support includes motor driven rollers in driving engagement with said frame for rotatably driving said frame about said axis.

3. The hydraulic press of claim 1 including flexible tubes connecting said control means to said frame, said tubes being adapted for movement with the frame during rotation thereof.

4. The hydraulic press of claim 3 wherein said frame includes a tube supporting arcuate peripheral surface and said tubes are adapted to be carried by said surface during rotation of said frame.

5. The hydraulic press of claim 1 wherein said control means includes computer mean controlling the operation of the press assembly including the polymerization of synthetic materials being molded therein under heat and pressure.

6. A method of forming a hub for a helicopter rotor and the like in a heated hydraulic press comprising the steps of initially heating the heating plates of the press assembly; positioning one of a pair of confronting plates in its lowermost position; loading and fixing moldable material on said one positioned plate; rotating the press assembly 180° about its axis to bring the other of the pair of plates to its lower-most position in registry with the stock receiving position of said one plate; loading and fixing moldable material on said other plate while in its lowermost position; closing the pair of plates, applying pressure and an increase in temperature to the material held by said plates to effect polymerization and formation of said hub, and subsequently cooling and ejecting said hub from said press.

* * * * *